(No Model.)
O. F. GRANT.
FOUNTAIN PEN.
No. 394,171. Patented Dec. 11, 1888.
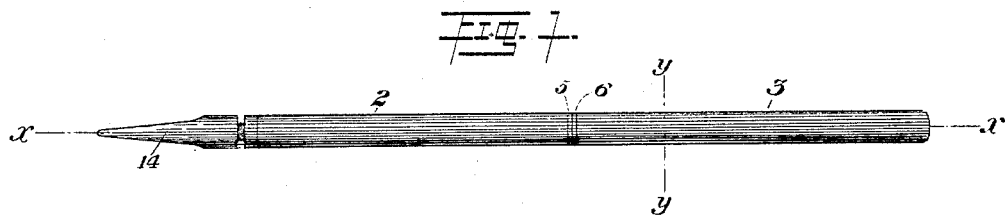
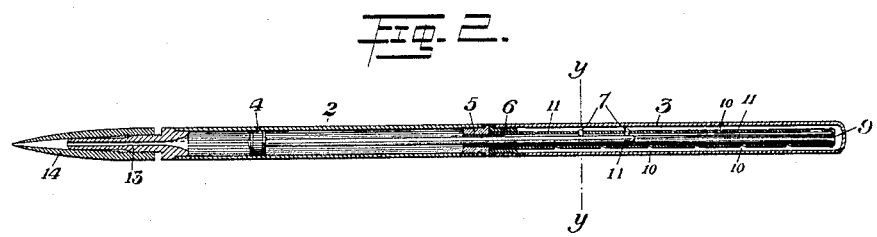
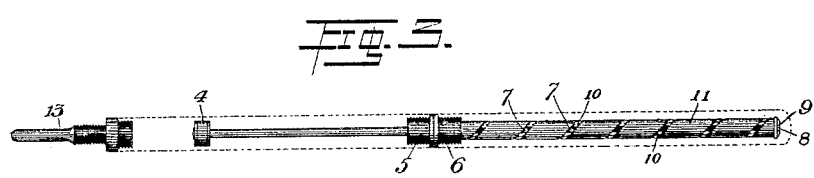
 
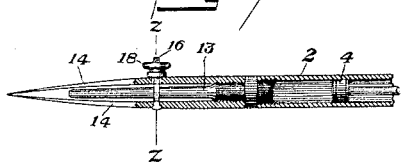 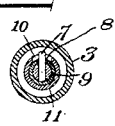 
WITNESSES.
H. L. Gill.
N. H. Corwin.
INVENTOR.
Oscar F. Grant.
by his attorneys
W. Bakewell & Sons.

UNITED STATES PATENT OFFICE.

OSCAR F. GRANT, OF ALLEGHENY, ASSIGNOR OF ONE-HALF TO RICHARD FLOYD, OF PITTSBURG, PENNSYLVANIA.

FOUNTAIN-PEN.

SPECIFICATION forming part of Letters Patent No. 394,171, dated December 11, 1888.

Application filed July 16, 1888. Serial No. 280,106. (No model.)

*To all whom it may concern:*

Be it known that I, OSCAR F. GRANT, of Allegheny, in the county of Allegheny and State of Pennsylvania, have invented a new and useful Improvement in Fountain-Pens; and I do hereby declare the following to be a full, clear and exact description thereof, reference being had to the accompanying drawings, forming part of this specification, in which—

Figure 1 is a plan view of my improved ruling-pen. Figure 2 is a longitudinal sectional view on the line $xx$ of Fig. 1. Fig. 3 is a plan view of the worm-sleeve piston and nozzle, the outer casing being indicated by dotted lines. Fig. 4 is a detached view of the piston. Fig. 5 is a like view of the slotted guide-sleeve. Fig. 6 is an enlarged cross-section on the line $yy$ of Figs. 1 and 2. Fig. 7 is a longitudinal sectional view of a modified form of pen-point. Fig. 8 is a cross-section on the line $z$ $z$ of Fig. 7.

Like letters and figures indicate like parts in each.

In the drawings, 2 3 represent the outer casing made in two parts, the forward portion, 2, serving as an ink-fountain, while the rear portion, 3, serves as a casing to the feed mechanism. This feed mechanism consists of a piston-head, 4, situate within the fountain-casing 2, the piston-rod extending through the packing-rings 5 6, which are secured in the meeting ends of the casings 2 3 into the casing 3. Within the casing 3 the piston-rod is provided with one or more projecting pins, 7, which pass through a longitudinal slot, 8, in the guide-tube 9 and engage with the worm-slot 10 of the tube 11. The inner guide-tube, 9, is secured at its end in the packing-ring 5 of the casing 2, as is shown in Figs. 2 and 5. The other end of the tube 9 within the casing 3 is upset or enlarged outside of the outer worm-tube, 1. The worm-tube 11 fits within the packing-ring 6 and is secured thereto. The packing-rings 5 and 6 are secured in the casings 2 and 3 by suitable screw-threads. At the forward end of the casing 2 is a tapered mouth-piece or nozzle, 13, secured in the case 2 by a suitable screw-thread. On the outer portion of the mouth-piece 13 is a screw-thread, by which a right-line or ruling-pen, 14, is secured. This pen 14 has spring or hinge jaws tending to close on each other at the point. By screwing the pen down on the tapered mouth-piece the jaws are caused to separate, and thereby the width or heaviness of the line to be produced may be regulated. Instead of the spring-jaws described, the jaws may be held together by a screw-bolt and nut, as shown in Figs. 7 and 8. Owing to the central mouth-piece or nozzle, the bolt 16 is provided with an eye, 17, between the jaws, and the jaws are contracted or loosened by turning the nut 18.

The operation is as follows: By turning the casing 3, the guide-rod 9 being held by the ring 5 in the case 2, the worm 11 turns with the case 3 and, acting on the pins 7, causes the piston-head 4 to advance so as to feed the ink to the pen, or to recede and draw the ink into the fountain-reservoir when it is necessary to fill the same.

Having thus described my invention, what I claim, and desire to secure by Letters Patent, is—

1. The ink-fountain 2 and the mouth-piece 13, fitted thereto at one end, and the packing-ring 5, fitted to the other end of said fountain and provided with the guide-tube 9, combined with the piston 4, arranged in the ink-fountain and having its stem extended into the guide-tube, and a worm engaged with said stem and adapted to be rotated to adjust the piston, substantially as described.

2. The ink-fountain, the mouth-piece 13 thereof, and the ruling-pen 14, adjustably secured to said mouth-piece, combined with the packing-ring 5, its slotted tube 9, the worm 11, the piston 4, having its stem extended into the tube 9 and engaged by the worm, and the external casing, 3, substantially as described.

In testimony whereof I have hereunto set my hand this 29th day of June, A. D. 1888.

OSCAR F. GRANT.

Witnesses:
JAMES N. ARROTT, Jr.,
W. B. CORWIN.